(12) United States Patent
Koga

(10) Patent No.: US 12,414,508 B2
(45) Date of Patent: Sep. 16, 2025

(54) IMAGING DIAGNOSIS APPARATUS, IMAGING DIAGNOSIS SYSTEM, IMAGING DIAGNOSIS METHOD, AND STORAGE MEDIUM

(71) Applicant: CANON KABUSHIKI KAISHA, Tokyo (JP)

(72) Inventor: Hironobu Koga, Hyogo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 419 days.

(21) Appl. No.: 17/845,071

(22) Filed: Jun. 21, 2022

(65) Prior Publication Data

US 2022/0312684 A1  Oct. 6, 2022

Related U.S. Application Data

(63) Continuation of application No. PCT/JP2020/047081, filed on Dec. 17, 2020.

(30) Foreign Application Priority Data

Jan. 16, 2020 (JP) .................................. 2020-004912

(51) Int. Cl.
*A01G 7/00* (2006.01)
*G06F 18/21* (2023.01)
*G06T 7/00* (2017.01)

(52) U.S. Cl.
CPC .................. *A01G 7/00* (2013.01); *G06T 7/00* (2013.01); *G06F 18/217* (2023.01)

(58) Field of Classification Search
CPC ............ G06T 7/00; G06T 2207/30188; G06V 20/188
See application file for complete search history.

(56) References Cited

U.S. PATENT DOCUMENTS

| | | | |
|---|---|---|---|
| 2015/0379350 A1* | 12/2015 | Li | G06V 20/188 |
| | | | 382/110 |
| 2019/0065890 A1* | 2/2019 | Lee | G06V 10/34 |
| 2019/0278988 A1* | 9/2019 | Papanikolopoulos | |
| | | | G06V 20/17 |
| 2020/0364456 A1* | 11/2020 | Tran | G06Q 50/02 |
| 2021/0307259 A1* | 10/2021 | Setlur | A01G 9/26 |
| 2022/0007589 A1* | 1/2022 | Binney | G06T 7/0012 |

(Continued)

FOREIGN PATENT DOCUMENTS

| | | | |
|---|---|---|---|
| CN | 109035209 A | * | 12/2018 |
| CN | 109684938 A | * | 4/2019 |

(Continued)

OTHER PUBLICATIONS

Liu, Tao, et al. "A method to calculate the number of wheat seedlings in the 1st to the 3rd leaf growth stages." Plant Methods 14 (2018): 1-14. (Year: 2018).*

(Continued)

*Primary Examiner* — Michael Robert Cammarata
(74) *Attorney, Agent, or Firm* — ROSSI, KIMMS & McDOWELL LLP

(57) ABSTRACT

An imaging diagnosis apparatus includes a first acquiring unit configured to acquire information on the number of leaves of a plant using an image of the plant, and a second acquiring unit configured to acquire the information on the number of stems of the plant using the information on the number of leaves.

10 Claims, 8 Drawing Sheets

(56) References Cited

U.S. PATENT DOCUMENTS

| | | | | |
|---|---|---|---|---|
| 2022/0189053 A1 | * | 6/2022 | Yao | A01B 79/005 |
| 2022/0304257 A1 | * | 9/2022 | Hiromitsu | G06T 7/0012 |

FOREIGN PATENT DOCUMENTS

| | | | | | |
|---|---|---|---|---|---|
| CN | 109685815 A | * | 4/2019 | | |
| CN | 109978047 A | | 7/2019 | | |
| CN | 110097104 A | * | 8/2019 | | |
| CN | 110148146 A | * | 8/2019 | | G06T 19/20 |
| CN | 114643784 B | * | 7/2024 | | B41J 2/14 |
| JP | 2003009664 A | | 1/2003 | | |
| JP | 2004121033 A | | 4/2004 | | |
| JP | 2017104037 A | * | 6/2017 | | |
| JP | 2018082648 A | | 5/2018 | | |
| JP | 2019040383 A | | 3/2019 | | |
| JP | 2020087286 A | | 6/2020 | | |
| WO | WO-9010273 A1 | * | 9/1990 | | |
| WO | WO-2021125285 A1 | * | 6/2021 | | A01G 22/20 |

OTHER PUBLICATIONS

Langer, Ferdinand, et al. "Geometrical stem detection from image data for precision agriculture." arXiv preprint arXiv:1812.05415 (2018). (Year: 2018).*

Itakura, Kenta, and Fumiki Hosoi. "Automatic leaf segmentation for estimating leaf area and leaf inclination angle in 3D plant images." Sensors 18.10 (2018): 3576. (Year: 2018).*

Henries, Dale G., and Rahman Tashakkori. "Extraction of leaves from herbarium images." 2012 IEEE International Conference on Electro/Information Technology. IEEE, 2012. (Year: 2012).*

Hamuda, Esmael, Martin Glavin, and Edward Jones. "A survey of image processing techniques for plant extraction and segmentation in the field." Computers and electronics in agriculture 125 (2016): 184-199. (Year: 2016).*

Miller, Travis D. "Growth stages of wheat." Better crops with plant food. Potash & Phosphate Institute 76 (1992): 12. (Year: 1992).*

English translation of Written Opinion issued in Intl. Appln. No. PCT/JP2020/047081 mailed Mar. 9, 2021. previously cited in IDS filed on Jun. 21, 2022.

International preliminary report on patentability issued in Intl. Appln. No. PCT/JP2020/047081 mailed on Jul. 19, 2022.

International Search Report issued in Intl. Appln. No. PCT/JP2020/047081 mailed Mar. 9, 2021. English translation provided.

Written Opinion issued in Intl. Appln. No. PCT/JP2020/047081 mailed Mar. 9, 2021.

* cited by examiner

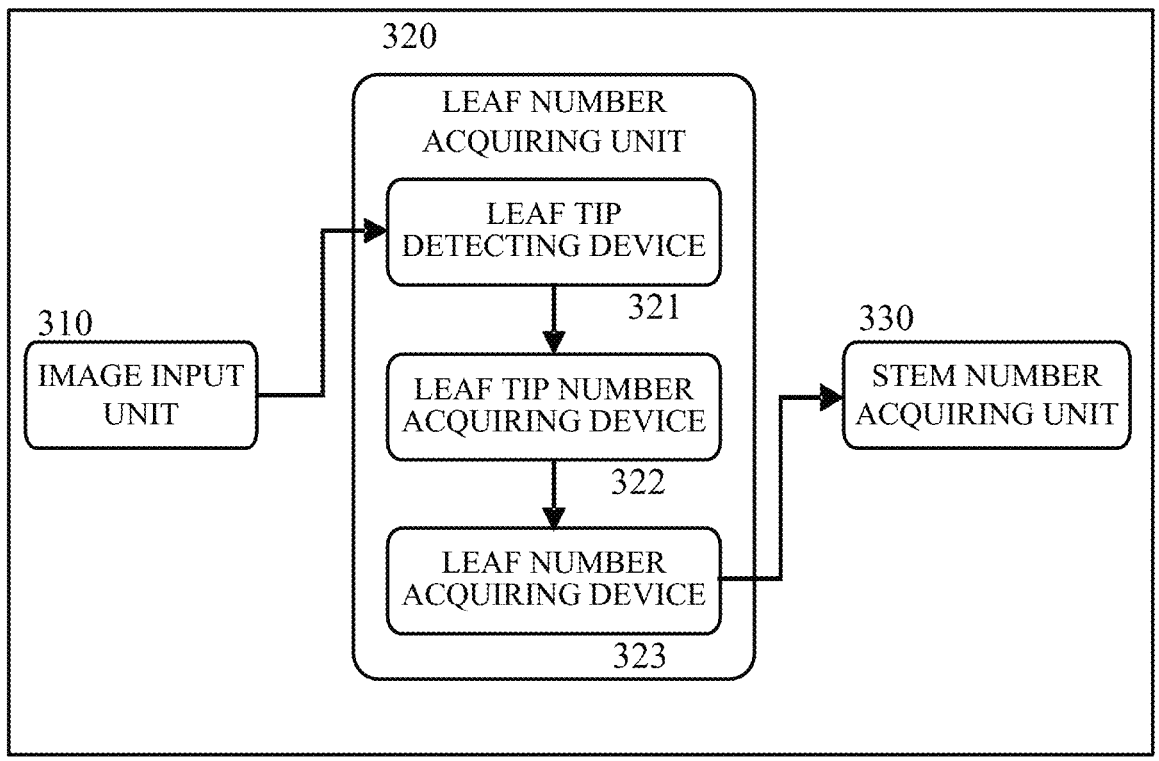
FIG. 7
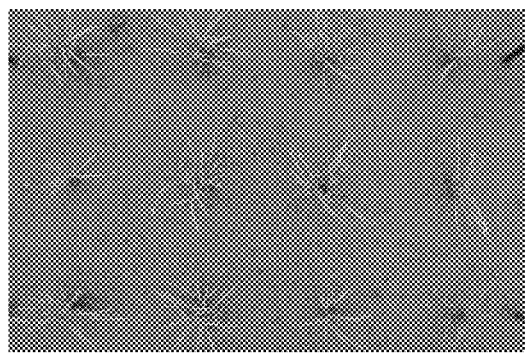
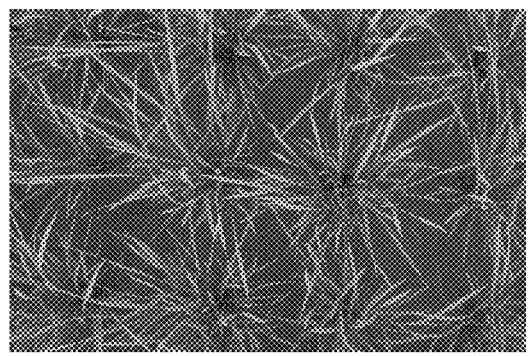
FIG. 8A  FIG. 8B

IMAGING DIAGNOSIS APPARATUS, IMAGING DIAGNOSIS SYSTEM, IMAGING DIAGNOSIS METHOD, AND STORAGE MEDIUM

CROSS-REFERENCE TO RELATED APPLICATIONS

This application is a Continuation of International Patent Application No. PCT/JP2020/047081, filed on Dec. 17, 2020, which claims the benefit of Japanese Patent Application No. 2020-004912, filed on Jan. 16, 2020, both of which are hereby incorporated by reference herein in their entirety.

BACKGROUND

Technical Field

The disclosure relates to an imaging diagnosis apparatus, an imaging diagnosis system, an imaging diagnosis method, and a storage medium, each of which acquires the number of stems of a plant using an image of the plant.

Description of the Related Art

A method of acquiring the number of stems using an image of a plant has recently been proposed. Japanese Patent Laid-Open No. ("JP") 2018-82648 discloses a method of calculating a vegetation coverage rate, which is an index representing a ratio of paddy rice to an imaged area, using an image of paddy rice, and of acquiring the number of stems based on a correlation between the vegetation coverage rate and the number of stems.

However, the correlation between the vegetation coverage rate and the number of stems differs according to a cultivation condition, such as the planting density (number of plants per unit area) and the planted number per plant (root or stump). Thus, in order to use the method disclosed in JP 2018-82648, it is necessary to acquire the correlation between the vegetation coverage rate and the number of stems for each cultivation condition. Moreover, when paddy rice grows and the vegetation coverage rate approaches 1 in the method disclosed in JP 2018-82648, the vegetation coverage rate is less likely to change even if the number of stems increases and it is thus difficult to properly obtain the number of stems.

SUMMARY

The disclosure provides an imaging diagnostic apparatus, an imaging diagnosis system, an imaging diagnosis method, and a storage medium, each of which can easily and properly acquire the number of stems of a plant using an image of the plant.

An imaging diagnosis apparatus according to one aspect of the disclosure includes a first acquiring unit configured to acquire information on the number of leaves of a plant using an image of the plant, and a second acquiring unit configured to acquire the information on the number of stems of the plant using the information on the number of leaves. An imaging diagnosis system including the above the imaging diagnosis apparatus also constitutes another aspect of the disclosure.

An imaging diagnosis method according to another aspect of the disclosure includes the steps of acquiring information on the number of leaves of a plant using an image of the plant, and acquiring information on the number of stems of the plant using the information on the number of leaves. A non-transitory computer-readable storage medium storing a program that causes a computer to execute the above imaging diagnosis method also constitutes another aspect of the disclosure.

Further features of the disclosure will become apparent from the following description of exemplary embodiments with reference to the attached drawings.

BRIEF DESCRIPTION OF THE DRAWINGS

FIG. 7 is a software configuration diagram of the imaging diagnosis apparatus according to the first embodiment.

FIGS. 8A and 8B illustrate an example of images of part of a field captured from above.

DESCRIPTION OF THE EMBODIMENTS

Figure 1:
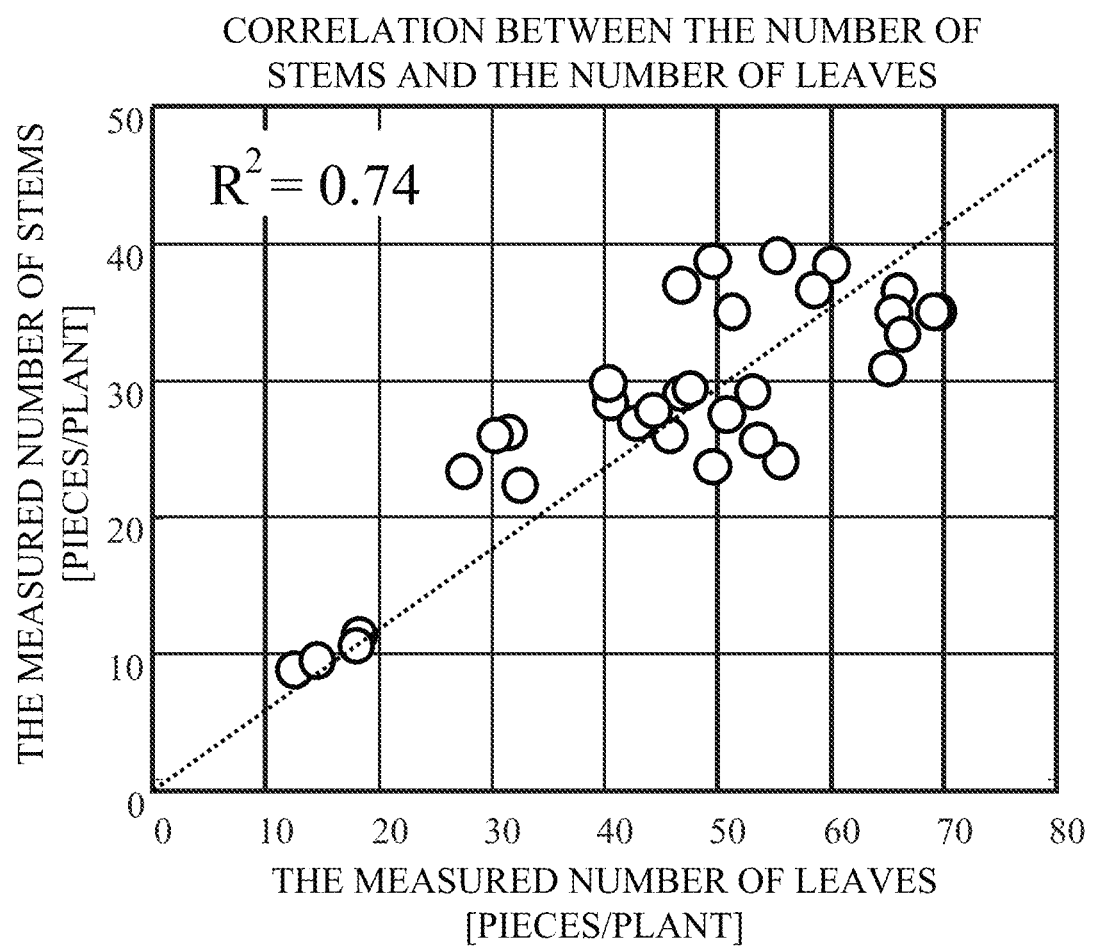
FIG. 1 illustrates a correlation between the measured number of leaves and the measured number of stems.

Referring now to the accompanying drawings, a detailed description will be given of embodiments according to the disclosure. Corresponding elements in respective figures will be designated by the same reference numerals, and a duplicate description thereof will be omitted.

A gist of the disclosure will now be described before a specific description of each embodiment is given. In this disclosure, the number of stems of a plant is acquired based on the number of leaves obtained by using an image of the plant by utilizing a fact that the number of leaves (a leaf number) of the plant correlates with the number of stems of the plant. In particular, in this disclosure, the number of stems is acquired based on the number of leaves obtained by using an image of rice, a correlation between the number of leaves and the number of stems of rice. In the following, rice will be used as an example of the plant.

FIG. 1 illustrates the correlation between the measured number of leaves and the measured number of stems. The measured number of leaves is the number of leaves acquired using an image of paddy rice. The measured number of stems is the number of stems per plant (root) of paddy rice actually measured by hand. A determination coefficient is 0.74 as illustrated in FIG. 1, and there is a strong correlation between the measured number of leaves and the measured number of stems. That is, the number of stems can be acquired with the measured number of leaves.

The correlation between the number of leaves and the number of stems does not depend on the planting density or the planted number per plant and has a relationship peculiar to paddy rice. Thus, the disclosure can easily acquire the number of stems using the same method and the same parameters even if the cultivation condition of paddy rice is different. Moreover, the disclosure acquires the measured number of leaves using the number of leaf tips (leaf tip number) as described below, and thus can properly acquire the number of stems even in a late growth stage when the vegetation coverage ratio approaches 1.

Figure 2:
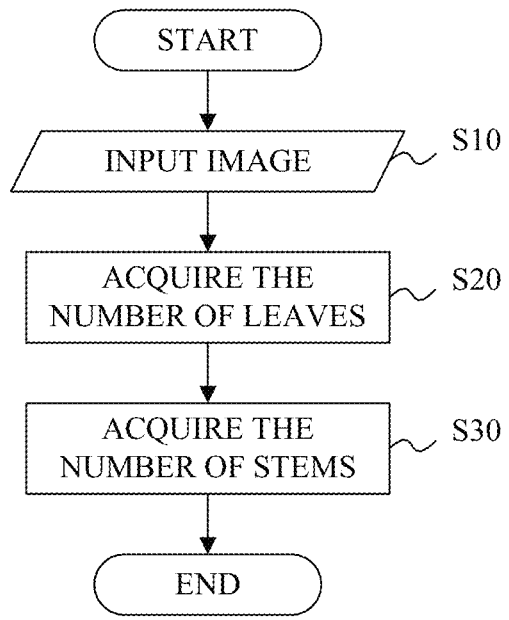
FIG. 2 is a flowchart illustrating an imaging diagnosis method in the disclosure.

A description will now be given of an imaging diagnosis method for acquiring the number of stems of a plant using an image of the plant in the disclosure. In this disclosure, information on the number of leaves and information on the number of stems may not be direct information on the number of leaves or direct information on the number of stems, but may be modified information or information added to the above information. FIG. 2 is a flowchart illustrating the imaging diagnosis method in the disclosure.

In step S10, an image of paddy rice is input. As described below, this embodiment detects leaf tips of paddy rice in order to acquire the number of stems of rice. Since leaves of paddy rice grow from the ground to the sky, the leaf tips of paddy rice are always located high above the ground. Hence, when paddy rice is imaged from above, leaf tips can be easily recognized. Thus, in acquiring the number of stems of rice, an image of paddy rice captured from above may be used.

In step S20, the leaf number measurement value (information on the number of leaves) is acquired using the input paddy rice image.

Figure 3:
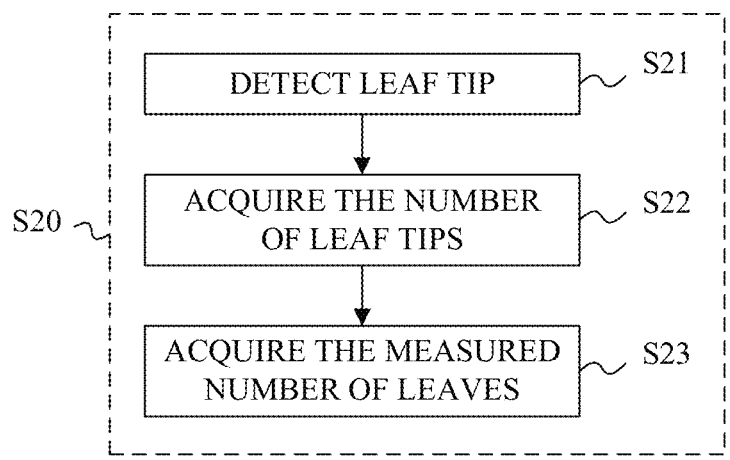
FIG. 3 is a flowchart illustrating details of step S20 in FIG. 2.

FIG. 3 is a flowchart illustrating details of step S20 in FIG. 2.

Figure 4A:
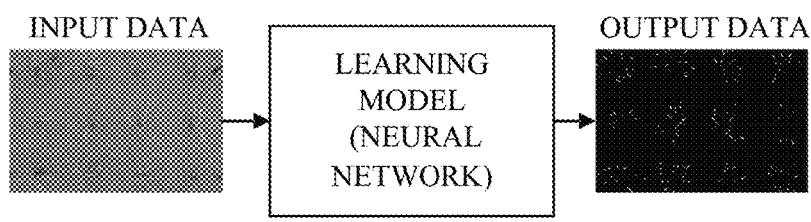
FIGS. 4A and 4B are conceptual diagrams of a learning model in the disclosure.

In step S21, leaf tips of the paddy rice are detected from the image of paddy rice, and the image is output in which the leaf tips are detected (leaf-tip detected image). The processing of step S21 may be implemented, for example, by a learned model configured by machine learning. The learned model may be formed, for example, by a neural network illustrated in FIG. 4A in which input data is the image of paddy rice and output data is the leaf-tip detected image.

Figure 4B:
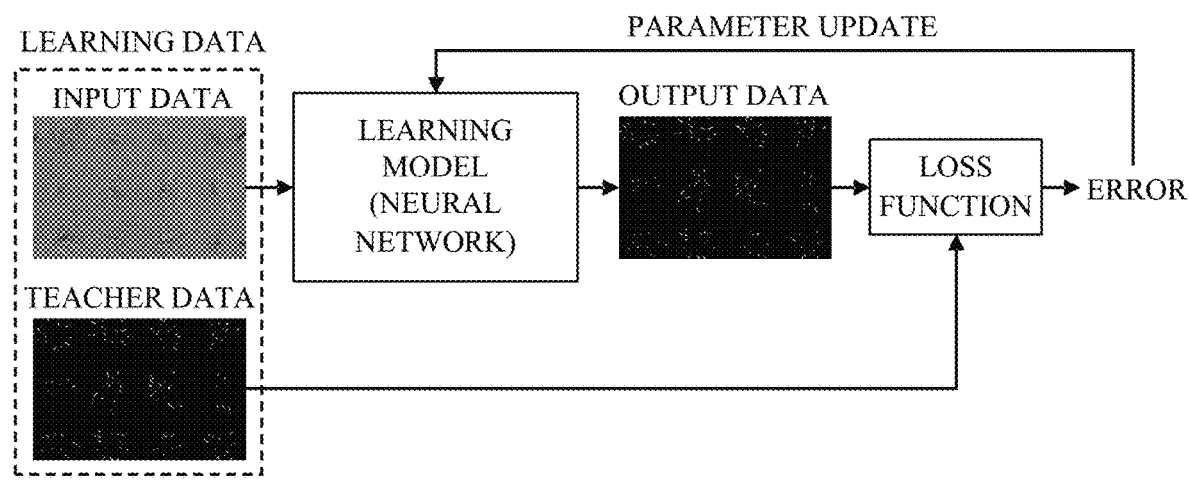

In constructing the learned model by the neural network, as illustrated in FIG. 4B, the image of paddy rice may be used as input data, and a labeling image obtained by labeling the leaf tip and an area other than the leaf tip in the plant with different values may be used as teacher data. The labeling image may use an image, as illustrated in FIG. 4B, which is made, for example, by labeling the leaf tip area with 1 and the area other than the leaf tips with 0. However, the teacher data is not limited to the above data, and may use a labeling image in which an area other than the leaf tips are further classified.

Learning with the neural network may be performed by the method illustrated in FIG. 4B. First, an error corresponding to a difference between the output data output from an output layer according to the input data input to an input layer and the teacher data is calculated using a loss function. Next, a connection weighting coefficient between nodes of the neural network is updated so that the obtained error becomes small. In this update, for example, the connection weighting coefficient and the like are updated so as to reduce the above error by using an error backpropagation method that adjusts the connection weighting coefficient or the like between the nodes of the neural network.

The processing of step S21 is not limited to the method using the machine learning, and may be implemented by a pattern recognition technology such as pattern matching or a method using a local feature amount such as SIFT feature amount.

In step S22, the number of leaf tips is acquired by using the leaf-tip detected image output in step S21. In this embodiment, the number of leaf tips is acquired by using the labeling processing with the leaf-tip detected image output in step S21 as an input. More specifically, first, in the leaf-tip detected image, a pixel value of a pixel detected as the leaf tip is set to 1, and a pixel value of a pixel detected as an area other than the leaf tip is set to 0. Next, the number of leaf tips in the leaf-tip detected image is acquired by the labeling processing where a group of areas in which adjacent pixels have pixel values of 1 is set to a single leaf tip.

In step S23, the measured number of leaves (information on the number of leaves) is acquired by using the number of leaf tips acquired in step S22. In some plants, one leaf may have a plurality of leaf tips, but in paddy rice, one leaf has one leaf tip, so this step assumes that the number of leaf tips is equal to the number of leaves, and acquires the number of leaves.

The processing of step S20 is not limited to the above method, and the measured number of leaves may be acquired by using another method.

In step S30, the number of stems (information on the number of stems) is acquired by using the measured number of leaves (information on the number of leaves). When the number of stems is acquired, the relational expression calculated based on the correlation in FIG. 1 is used. More specifically, the number of stems $Y_{est}$ is acquired by the following expression (1), where X is the measured number of leaves acquired in step S23.

$$Y_{est} = \sum_{i=0}^{M} a_i X^i \quad (1)$$

where $a_i$ (i=0, . . . , M) is a coefficient based on the correlation between the measured number of leaves and the measured number of stems in FIG. 1. For example, where $(X_j, Y_j)$ (j=1, . . . , N) represents N pairs of data of the measured number of leaves and the measured number of stems, $a_i$ is expressed as follows:

$$\min_{a_i} \sum_{j=1}^{N} \left\{ Y_j - \left( \sum_{i=0}^{M} a_i X_j^i \right) \right\}^2$$

The disclosure can acquire the number of stems in the image of paddy rice by implementing the above steps.

The number of stems of paddy rice is usually expressed by the number of stems per plant or the number of stems per unit area. Accordingly, in acquiring the number of stems per plant or the number of stems per unit area, an analysis area ROI may be previously set.

Figures 5A, 5B:
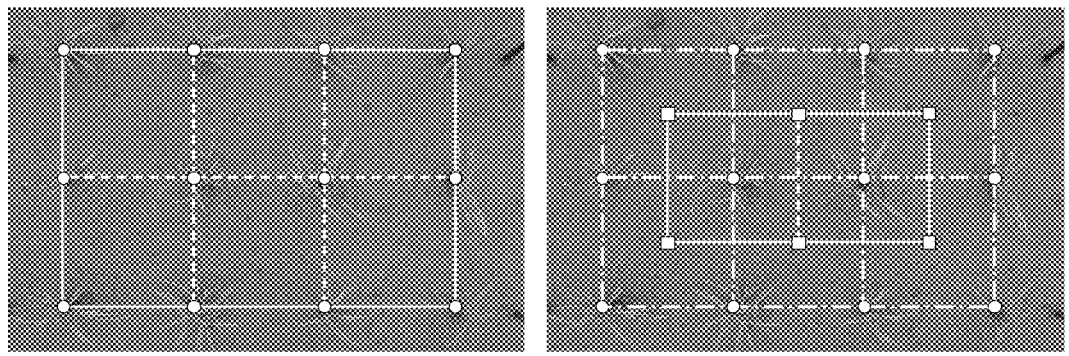
FIGS. 5A and 5B illustrate an example of a setting method of an analysis area.

FIG. 5A illustrates an example of a setting method of the analysis area ROI. In FIG. 5A, a white dot represents a central position of each rice plant in the image, a broken line represents a line connecting adjacent white dots on a grid, and a solid line represents the analysis area ROI. In FIG. 5A, in the 3×4 rice plants, an area connecting the central positions of the rice plants located on the outermost circumference (the area corresponding to the land area of paddy rice for 6 plants) is set as the analysis area ROI.

In setting the analysis area ROI, the center position of the rice plant may be manually set by the user who is viewing the image of the paddy rice, or may be automatically set by using a pattern recognition technique or the like.

If the analysis area ROI is set as a range for acquiring the number of leaf tips in step S22, the number of leaf tips per analysis area ROI can be acquired. In step S23, the measured number of leaves per analysis area ROI can be acquired. Thus, in step S30, the number of stems $Y_{est}$ per analysis area ROI can be acquired by using the measured number of leaves X per analysis area ROI.

The number of stems per plant can be obtained as $Y_{est}/L$ and the number of stems per unit area can be obtained as $Y_{est}/S$ where L is the number of plants in the analysis area ROI and S is the area of the analysis area ROI. The area S of the analysis area ROI can be obtained by using the actual area of the analysis area ROI on an image sensor plane and an imaging magnification during imaging. The area S of the analysis area ROI may be obtained from the planting interval (between shoots or between plants) during rice planting of paddy rice.

The analysis area ROI may be set by a method illustrated in FIG. 5B. In FIG. 5B, a white dot represents a central position of each rice plant in the image, an alternate long and short dash line is a line connecting adjacent white dots on the grid, and a white rectangle represents a center-of-gravity position calculated based on coordinates of the four closest white dots forming a square. A solid line represents the analysis area ROI. A broken line represents an auxiliary line indicating an analysis area per plant. In FIG. 5B, an area connecting the center-of-gravity positions set from the central positions of the 3×4 rice plants so as to surround the two central plants is set as the analysis area ROI.

In FIGS. 5A and 5B, the number of plants in the analysis area ROI is six plants and two plants, respectively, but the number of plants in the analysis area ROI can be arbitrarily set according to the purpose. For example, in acquiring the number of stems for each plant, the number of plants in the analysis area ROI may be set to one. In acquiring an average value in the field, the number of plants in the analysis area ROI may be set to be two or more. In order to make the average value in the field a reliable value, the number of plants in the analysis area ROI may be set to be ten or more.

A description will now be given of details of each embodiment in this disclosure.

First Embodiment

In this embodiment, an imaging diagnosis apparatus 300 can acquire the number of stems of a plant using an image of a plant by carrying out the imaging diagnosis method of the disclosure. In this embodiment, rice will be used as an example of the plant.

Figure 6:
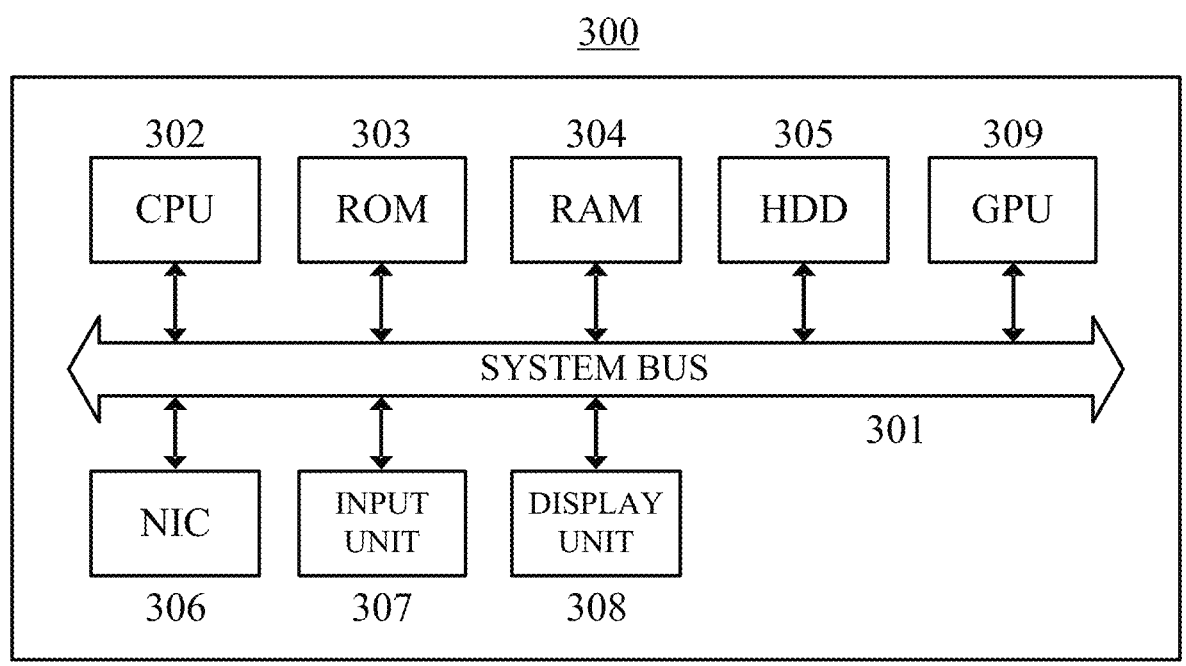
FIG. 6 is a hardware configuration diagram of an imaging diagnosis apparatus according to a first embodiment.

FIG. 6 is a hardware configuration diagram of the imaging diagnosis apparatus 300. The imaging diagnosis apparatus 300 includes a system bus 301 for transferring data between the components, a CPU 302, a ROM 303, a RAM 304, an HDD 305, a NIC 306, an input unit 307, a display unit 308, and a GPU 309.

FIG. 7 is a software configuration diagram of the imaging diagnosis apparatus 300. The imaging diagnosis apparatus 300 includes an image input unit 310, a leaf number (the number of leaves) acquiring unit (first acquiring unit) 320, and a stem number (the number of stems) acquiring unit (second acquiring unit) 330. The leaf number acquiring unit 320 has a leaf tip detecting device (detecting unit) 321, a leaf tip number acquiring device 322, and a leaf number acquiring device 323. The leaf number acquiring unit 320 and the stem number acquiring unit 330 may each include a processor and a memory programmed to perform each function.

An image of paddy rice is input to the image input unit 310. The image is input by reading the image stored in the memory such as the ROM 303 or the HDD 305 into the RAM 304, or by reading the image stored on the network into the RAM 304 via the NIC 306.

The leaf number acquiring unit 320 acquires the measured number of leaves (information on the number of leaves) using the image read on the RAM 304. More specifically, first, the leaf tip detecting device 321 generates the leaf-tip detected image from the input image. This embodiment generates the leaf-tip detected image using the learned model configured by the neural network. Information on the structure of the learned model and various parameters is previously stored in the ROM 303 or HDD 305. In performing processing of generating the leaf-tip detected image using the leaf tip detecting device 321, processing with the GPU 309 is effective in the case of calculation processing of the neural network because the GPU 309 can perform efficient calculations by processing more data in parallel.

Next, the leaf tip number acquiring device 322 acquires the number of leaf tips using the leaf-tip detected image. In this embodiment, the number of leaf tips is acquired by the CPU 302 or the GPU 309 by using the labeling processing. In this embodiment, the number of leaf tips in the analysis area ROI1 is acquired, which is the area corresponding to the planting area of the paddy rice for six plants described with reference to FIG. 5A. The analysis area ROI1 is set based on the information previously stored in the ROM 303 or the HDD 305, or is set by the user directly inputting from the input unit 307.

Next, the leaf number acquiring device 323 acquires the measured number of leaves using the number of leaf tips. In this embodiment, since the plant is rice, the leaf number acquiring device 323 acquires the number of leaf tips as the measured number of leaves. The leaf number acquiring device 323 is processed by the CPU 302.

The stem number acquiring unit 330 acquires the number of stems (information on the number of stems) using the measured number of leaves and the expression (1). This embodiment acquires the number of stems by setting M, a0, and a1 to 1, 0, 0.59, respectively. The acquired number of stems is stored in the ROM 303 or HDD 305. The acquired number of stems may be stored in an unillustrated external storage device connected to the network via the NIC 306. The acquired number of stems may be displayed on the display unit 308. The stem number acquiring unit 330 is processed by the CPU 302.

FIGS. 8A and 8B illustrate an example of images captured from above of part of a Koshihikari field where rice was planted under a first cultivation condition in which the planting density was 37 plants/tsubo (tsubo=about 3.3 m$^2$) and the planted number was 4 pieces/plant. The rice planting date of the field in FIGS. 8A and 8B is May 15, and FIGS. 8A and 8B illustrate images captured on June 4 and July 11, respectively. Although the images of FIGS. 8A and 8B are displayed in monochrome, an RGB image is used for actual image diagnosis. A monochrome image may be used to detect rice-leaf tips, but a multiband image having two or more bands may be used because the detection accuracy of the leaf tip is improved by using the color information.

Figure 9:
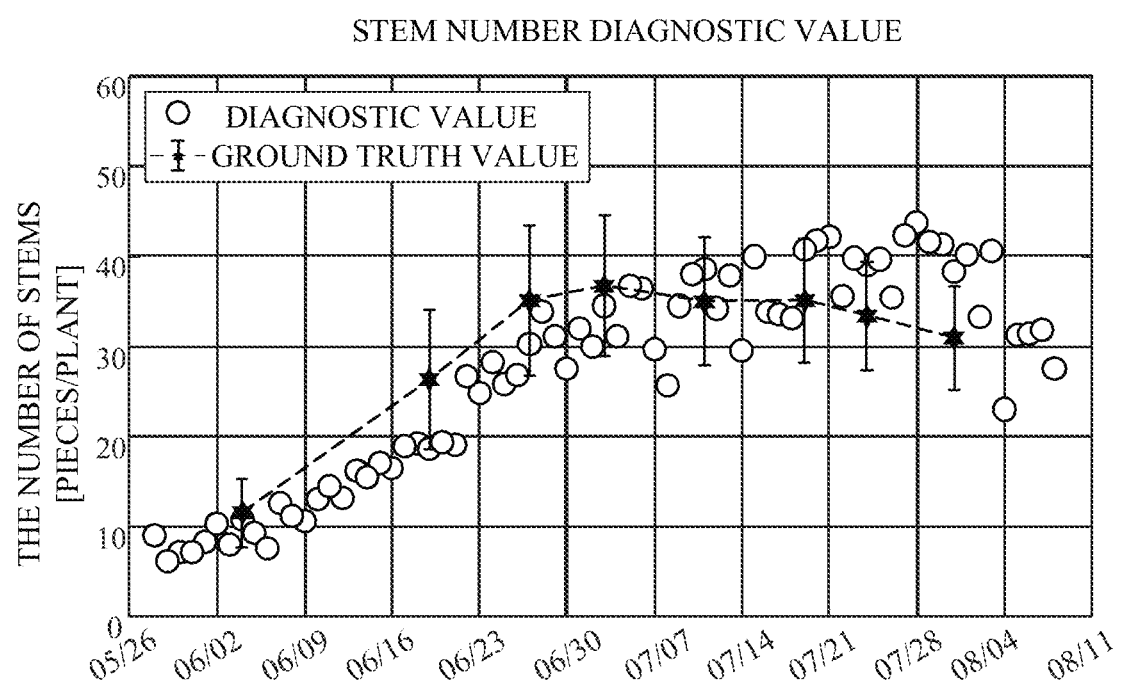
FIG. 9 illustrates an acquisition result of the number of stems.

FIG. 9 illustrates a result of acquiring the number of stems using a fixed-point captured image of a Koshihikari field planted under the first cultivation condition. A horizontal axis represents the date, and a vertical axis represents the number of stems per plant. A white dot denotes a diagnostic value (acquired value) acquired by using the imaging diagnosis method in this disclosure, a black star denotes a ground truth value calculated by averaging measured values in the 3×4 rice plants included in the analysis area ROI1, and an error bar denotes a standard deviation of the measured values in the 3×4 rice plants. As illustrated in FIG. 9, the diagnostic value illustrates a value close to the ground truth value, and it can be confirmed that the imaging diagnosis method in this disclosure is effective.

Second Embodiment

In this embodiment, an imaging diagnosis system 400 can acquire the number of stems of a plant using an image of the plant by implementing the imaging diagnosis method in the disclosure. In this embodiment, rice will be used as an example of the plant.

Figure 10:
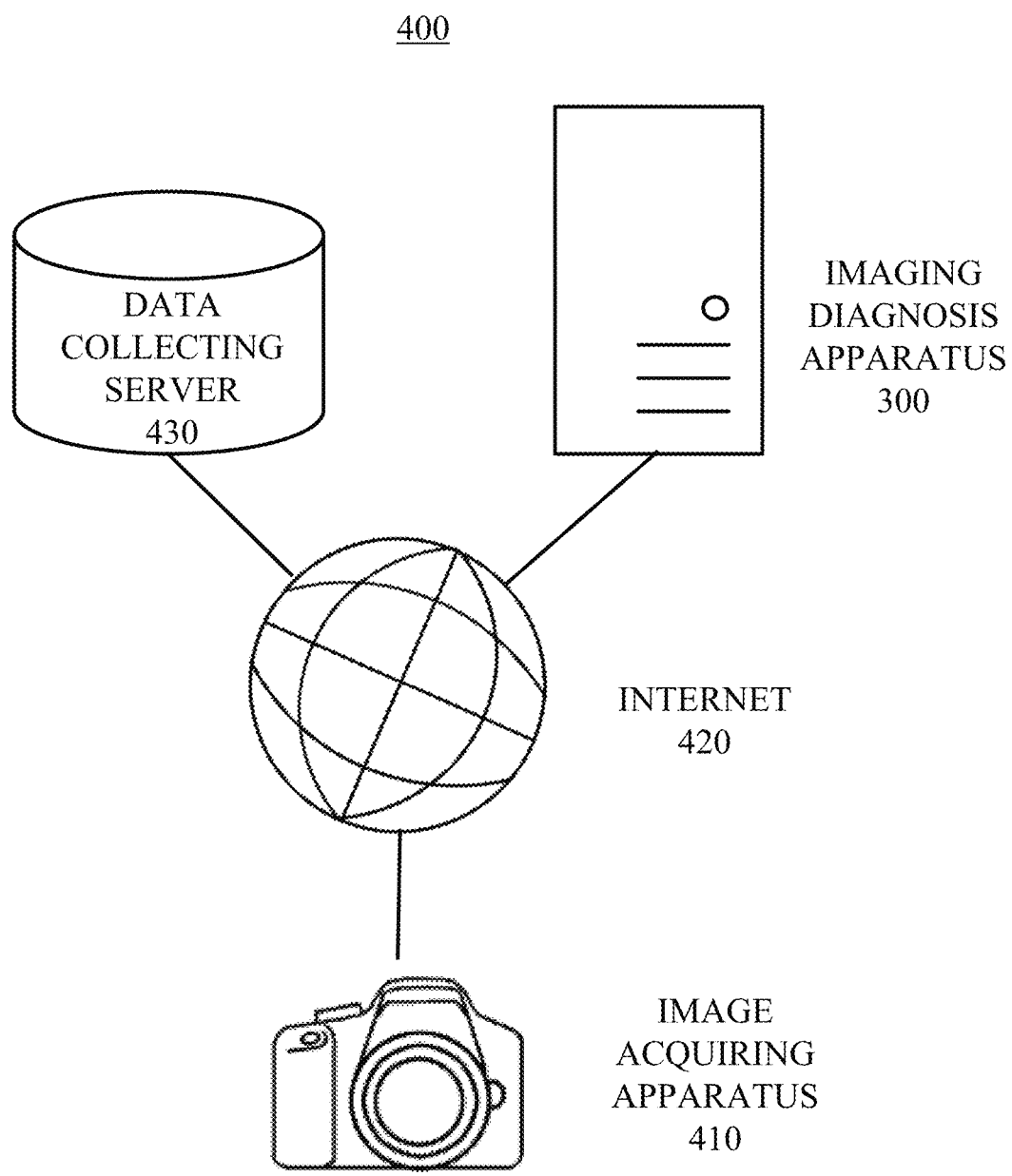
FIG. 10 is a block diagram of an imaging diagnosis system according to a second embodiment.

FIG. 10 is a configuration diagram of the imaging diagnosis system 400 according to this embodiment. The imaging diagnosis system 400 includes an image acquiring apparatus 410, Internet 420, a data collecting server (storage device or memory) 430, and the imaging diagnosis apparatus 300.

The image acquiring apparatus 410 acquires an image of paddy rice. The image acquired by the image acquiring apparatus 410 is stored in the data collecting server 430 via the Internet 420. The imaging diagnosis apparatus 300 reads the image of paddy rice stored in the data collecting server 430 via the Internet 420, and acquires the number of stems using the image of paddy rice by the method described in the first embodiment.

Figure 11A:
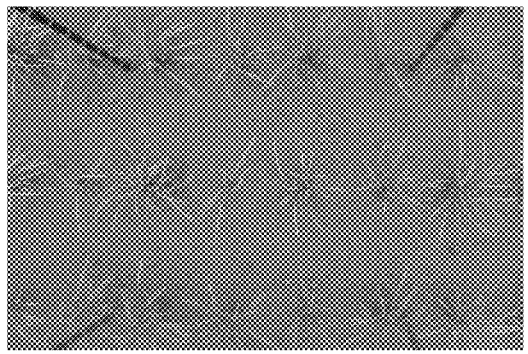
FIGS. 11A and 11B illustrate an example of images of part of a field captured from above.
Figure 11B:
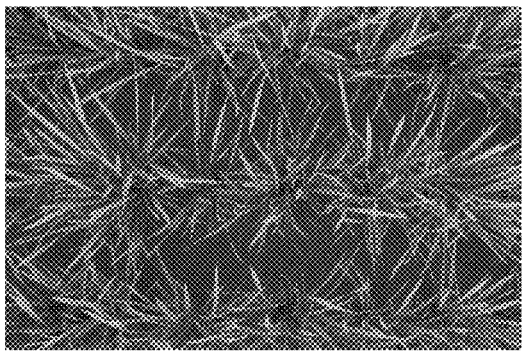

FIGS. 11A and 11B illustrate an example of images captured from above of part of a Koshihikari field where rice was planted under a second cultivation condition in which the planting density was 60 plants/tsubo and the planted number was 4 pieces/plant. In the field in FIGS. 11A and 11B, a gap between plants is narrower than that of the field in FIGS. 8A and 8B described in the first embodiment, and the planting density is increased. The rice planting date in the field in FIGS. 11A and 11B is May 15, and FIGS. 11A and 11B illustrate images captured on June 4 and July 11, respectively. Although the images of FIGS. 11A and 11B are displayed in monochrome, an RGB image is used for actual imaging diagnosis.

Figure 12:
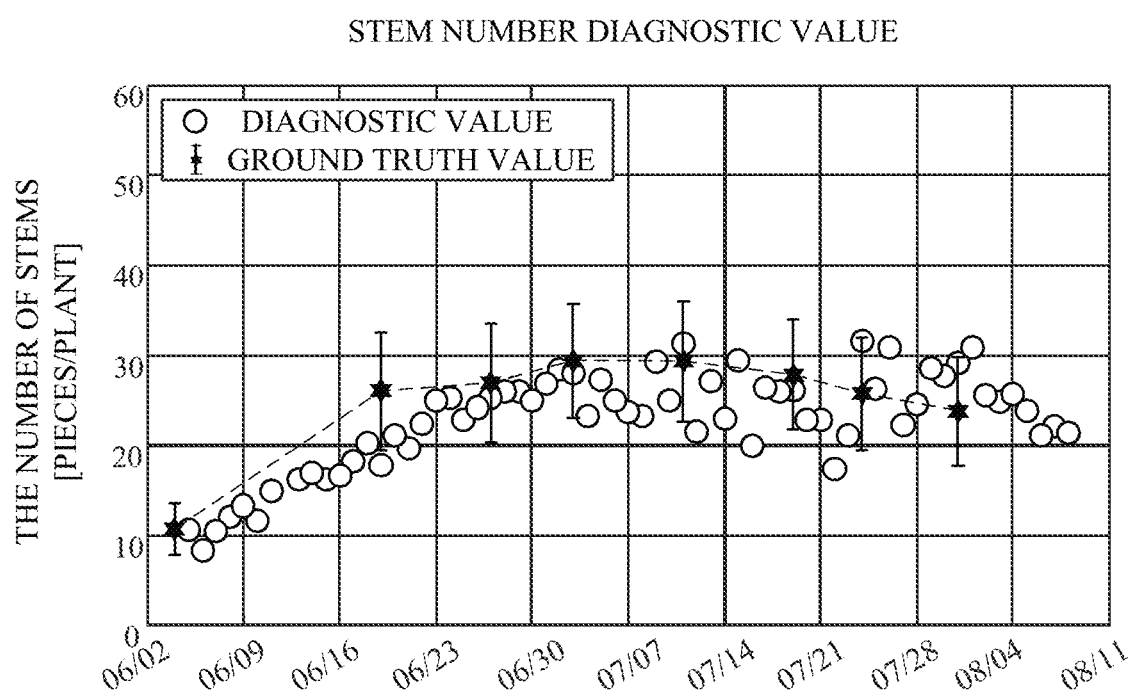
FIG. 12 illustrates an acquisition result of the number of stems.

FIG. 12 illustrates a result of acquiring the number of stems using a fixed-point captured image of a Koshihikari field planted under the second cultivation condition. A horizontal axis represents the date, and a vertical axis represents the number of stems per plant. Since the second cultivation condition is different in the gap between plants from the first cultivation condition, the area of the analysis area ROI2, which is an area corresponding to the planting area of paddy rice for six plants in this embodiment, is different from the area of the analysis area ROI1 in the first embodiment, but other parameters are the same as those of the first embodiment. A white dot denotes a diagnostic value (acquired value) acquired by using the imaging diagnosis method in this disclosure, and a black star denotes a ground truth value calculated by averaging measured values in the 3×4 rice plants included in the analysis area ROI2, and an error bar denotes a standard deviation of the measured values of the 3×4 rice plants. As illustrated in FIG. 12, the diagnostic value illustrates a value close to the ground truth value, and it can be confirmed that the imaging diagnosis method in this disclosure is effective.

When the ground truth values in FIGS. 9 and 12 are compared with each other, it is confirmed that the field under the first cultivation condition has more stems than the field under the second cultivation condition in the late growth stage, and the diagnostic values illustrate similar results. Therefore, it can be confirmed that the diagnosis can distinguish a difference in the number of stems even in the late growth stage when the vegetation coverage rate approaches 1.

As described above, the configuration of this disclosure can easily and properly acquire the number of stems of a plant using an image of the plant regardless of the planting density, the number of plants planted, and the growing time.

Although rice has been described as an example of the plant in this specification, the plant of the disclosure is not limited to rice. Examples of plants other than rice include wheat. Similar to rice, wheat has a strong correlation between the number of leaves and the number of stems, and the leaf shape is similar to that of rice, so that this disclosure is applicable to wheat. However, the plants are not limited to rice and wheat as long as the disclosure is applicable.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application-specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage device of distributed computing systems, an optical disc (such as a compact disc (CD), digital versatile disc (DVD), or Blu-ray Disc (BD)™) a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An imaging diagnosis apparatus comprising:
at least one memory that stores instructions; and
at least one processor that executes the instructions to:
detect information regarding leaf tips of plants in a cultivated area, each of the plants in the cultivated area including a plurality of stems, using an image of the plants in the cultivated area;
acquire the number of leaf tips using the information regarding the leaf tips;
acquire information on the number of leaves of the plants in the cultivated area using the number of leaf tips;
acquire information on the number of stems of the plants in the cultivated area using a relational expression calculated based on a correlation between the information on the number of leaves and the information on the number of stems, wherein the relational expression is expressed as:

$$Y_{est} = \Sigma_{i=0}^{M} a_i X^i,$$

where X is the number of leaves, Y is the measured number of stems, $a_i$ (i=0, ..., M) is a coefficient based on a correlation between the number of leaves and the measured number of stems, which is represented by the following expression:

$$\min_{a_i} \sum_{j=1}^{N} \left\{ Y_j - \left( \sum_{i=0}^{M} a_i X_j^i \right) \right\}^2,$$

and $Y_{est}$ is the number of stems.

2. The imaging diagnosis apparatus according to claim 1, wherein the processor detects the information regarding the leaf tips using a learned model generated by machine learning.

3. The imaging diagnosis apparatus according to claim 2, wherein the learned model is acquired by learning using another image of another plants as input data and an image acquired by labeling leaf tips thereof and an area other than the leaf tips thereof with different values in the another plants as teacher data.

4. The imaging diagnosis apparatus according to claim 1, wherein the image is acquired by imaging the plants in the cultivated area from above.

5. The imaging diagnosis apparatus according to claim 1, wherein the plants in the cultivated area includes at least one of rice or wheat.

6. An imaging diagnosis system comprising:
the imaging diagnosis apparatus according to claim 1; and
an image acquiring apparatus configured to acquire the image of the plants in the cultivated area.

7. An imaging diagnosis method comprising the steps of:
detecting information regarding leaf tips of plants in a cultivated area, each of the plants in the cultivated area including a plurality of stems, using an image of the plants in the cultivated area;
acquiring the number of leaf tips using information regarding the leaf tips;
acquiring information on the number of leaves of the plants in the cultivated area using the number of leaf tips;
acquiring information on the number of stems of the plants in the cultivated area using a relational expression calculated based on a correlation between the information on the number of leaves and the information on the number of stems, wherein the relational expression is expressed as:

$$Y_{est} = \Sigma_{i=0}^{M} a_i X^i,$$

where X is the number of leaves, Y is the measured number of stems, $a_i$ (i=0, ..., M) is a coefficient based on a correlation between the number of leaves and the measured number of stems, which is represented by the following expression:

$$\min_{a_i} \sum_{j=1}^{N} \left\{ Y_j - \left( \sum_{i=0}^{M} a_i X_j^i \right) \right\}^2,$$

and $Y_{est}$ is the number of stems.

8. A non-transitory computer-readable storage medium storing a program executable by a computer to execute the imaging diagnosis method according to claim 7.

9. The imaging diagnosis apparatus according to claim 1, wherein the at least one processor executes the instructions to display the number of stems of the plants in the cultivated area on a display device.

10. The imaging diagnosis method according to claim 7, wherein the method further comprises the step of displaying the number of stems of the plants in the cultivated area on a display device.

* * * * *